United States Patent [19]
Perrone et al.

[11] 4,385,504
[45] May 31, 1983

[54] ADJUSTABLE WIRE SEAL

[75] Inventors: Terrence J. Perrone, Rochester; Theodore S. Bolton, Liverpool; Cosimo Caronna, Syracuse, all of N.Y.

[73] Assignee: Carrier Corporation, Syracuse, N.Y.

[21] Appl. No.: 264,911

[22] Filed: May 18, 1981

[51] Int. Cl.³ .............................................. F25D 23/12
[52] U.S. Cl. ................... 62/259.1; 62/262; 174/65 R
[58] Field of Search .............. 248/56, 74 R; 403/240; 285/194, 195, 205; 174/65 R; 62/259.1, 259.2, 298

[56] References Cited
U.S. PATENT DOCUMENTS 2,682,159  6/1954  Trask ..................................... 62/262
3,301,166  1/1967  Schwartz ............................ 62/262 X
4,306,109  12/1981  Nattel ................................. 174/65 R Primary Examiner—Lloyd L. King
Attorney, Agent, or Firm—Donald F. Daley; Robert P. Hayter

[57] ABSTRACT

Apparatus for securing wires passing through a partition of an air conditioning unit is disclosed. A wire slot having rounded edges is formed in a partition. A wire seal is slidably secured to the partition having a flare portion extending through the wire slot. Upon assembly, the wire seal is slid downwardly with the flare portion extending through the wire slot such that the wires are secured at the bottom of the slot and the remainder of the slot has a body portion of the wire seal preventing air flow therethrough. The wire seal is secured in position via fastening means and the flare portion acts to not only compress the wires at the bottom of the wire slot but to angle them downwardly preventing moisture from flowing along the wires into the indoor section of the unit.

8 Claims, 3 Drawing Figures

ADJUSTABLE WIRE SEAL

BACKGROUND OF THE INVENTION

1. Field of the Invention

The present invention relates to air conditioning units having an evaporator section and a condenser section within one unit. More particularly, the present invention relates to an apparatus for securing electrical wires in an opening through a partition dividing an air conditioning unit into an indoor section and an outdoor section.

2. Prior Art

Air conditioning units, such as the so-called self-contained air conditioning units which are commonly used for residential and similar applications, generally include closed refrigeration circuits having an evaporator and a condenser. The unit is normally divided by a partition into an evaporator section and a condenser section, the evaporator section communicating with room air to be conditioned and the condenser section communicating with external air such as outdoor air. Refrigerant flows through a refrigeration circuit absorbing heat energy from the room air at the evaporator and discharging heat energy to the external air at the condenser. The conventional refrigeration circuit is completed by the addition of a compressor and an expansion device and the appropriate connections between the components. In the evaporator section, air is drawn through the evaporator by the evaporator fan and subsequently discharged into the room. In the evaporator, refrigerant changes state from a liquid to a gas absorbing heat energy from the room air being circulated thereover. The gaseous refrigerant from the evaporator is returned to the compressor wherein its pressure and temperature are increased. The evaporator is located in the indoor section and the compressor is located in the outdoor section. From the compressor the hot gaseous refrigerant flows through the condenser wherein it is cooled to change state from a gas to a liquid. Heat energy is discharged to the ambient air being circulated over the condenser by the condenser fan. This liquid refrigerant is then conducted through the partition dividing the unit into the indoor and outdoor section and back to the indoor coil or evaporator to complete the refrigeration circuit.

In a conventional room air conditioning unit, the condenser and compressor as well as fan motors and capacitors which are the heat discharging components of the unit are located in that portion of the unit, the outdoor section, wherein heat energy is discharged to the ambient air. The evaporator and evaporator fan are located in the indoor section of the unit for absorbing heat energy from the air to be cooled. Additionally, the controls area including temperature sensing elements is normally located within the indoor section of the unit. In a conventional room air conditioning unit, it is necessary to have refrigerant line connections between the indoor section and the outdoor section. An interconnecting line between a condenser and evaporator and a suction line between the evaporator and the compressor are both required to pass through the partition. In addition thereto, electrical wiring between the controls area in the indoor section and the electrical components in the outdoor section, such as a compressor or fan motor, must pass through the partition. With the advent of high energy costs, improving the overall performance of an air conditioning unit has achieved additional significance. One method of improving performance is reducing internal energy losses in an air conditioning unit including reducing the transfer of heat energy between the outdoor section and the indoor section of the unit. One of the modes in which this heat transfer may occur is by air leakage through the partition at the location where the wires extend through the partition.

The present invention concerns providing a partition having a wire slot through which wires extending from the controls area in the indoor section may pass to the outdoor section. A wire seal is slidably mounted to the partition and includes a body portion for blocking a portion of the partition opening to prevent air flow therethrough. In addition thereto, the wire seal includes a flange portion which extends through the opening and acts to not only compress the wires but to incline them downwardly preventing water flow from the outdoor section to the indoor section. The combination of the opening in the partition and the wire seal acts to provide an adjustable sealing arrangement for securing a variable number or variable size group of wires in an opening.

SUMMARY OF THE INVENTION

An object of the present invention is to provide apparatus for use in an air conditioning unit.

Another object of the present invention is to provide a combination partition opening and wire seal for securing wires in a partition while reducing air leakage therethrough.

A further object of the present invention is to provide a partition opening and seal arrangement wherein wires extending therethrough are angled downwardly to prevent the flow of moisture along the wires from the outdoor section to the indoor section.

A further object of the present invention is to provide a safe, economical and reliable apparatus to be incorporated within an air conditioning unit.

Other objects will be apparent from the description to follow and the appended claims.

The preceeding objects are achieved according to a preferred embodiment of the invention by the provision of an air conditioning unit having a partition dividing the unit into an indoor section and an outdoor section. The partition additionally defines a wire slot having rounded edges to prevent damage to the wires extending through the slot. A wire seal is mounted to the partition in sliding arrangement therewith. The wire seal has a body portion for blocking air flow through the wire slot, a flare portion extending through the wire slot for angling the wires downwardly as they extend from the indoor section to the outdoor section and for securing the wire seal in position. A screw typically extends through a slot in the body portion of the wire seal and engages the partition to additionally secure the wire seal to the partition. The top flange connected to the body portion of the wire seal aids in the manipulation of the wire seal upwardly and downwardly.

DESCRIPTION OF THE PREFERRED EMBODIMENT

The embodiment described below is for use in a self-contained room air conditioning unit. It is to be understood that similar seal arrangements may be provided in other types of self-contained units and in other units wherein there is an air flow dividing member having wires extending therethrough. It is to be additionally understood that although this invention has been described relative to wires extending through a partition, an air blocking surface of a unit such as an air handling unit having flexible elements extending therethrough might also suitably use a seal of the type described.

Figure 1:
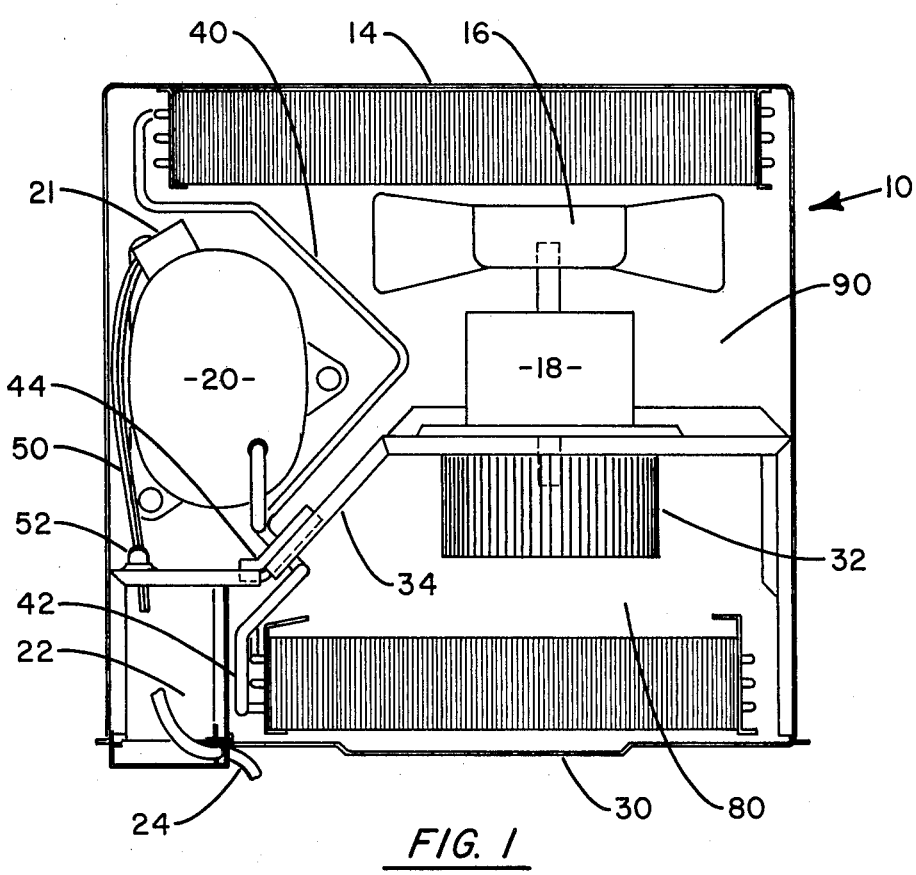
FIG. 1 is a top view of an air conditioning unit.

Referring first to FIG. 1 there can be seen an air conditioning unit 10 mounted to base pan 12. Partition 34 divides the unit into indoor section 80 and outdoor section 90. Within indoor section 80 evaporator 30, evaporator fan 32 and control box 22 are located. Within outdoor section 90 fan motor 18, condenser fan 16, condenser 14 and compressor 20 are all located. Hence, all the heat generating elements are located in the outdoor section and the evaporator for absorbing heat energy from the indoor air is located in the indoor section. If the unit described is a heat pump, a four-way valve would be included and the function of the heat exchangers would be reversible. Refrigerant line referenced as interconnecting line 40 is shown connecting condenser 40 to evaporator 30. Suction line 42 is shown connecting the evaporator to compressor 20. Both lines extend through partition 34 and seal 44. As may also be seen in FIG. 1, wires 50 extend from compressor terminal box 21 of compressor 20 and pass through partition 34 to the control box 22 of the unit. Wire seal 52 is shown mounted to partition 34. Additionally, power cord 24 is shown extending from control box 22 for connection to the home power source.

Figure 2:
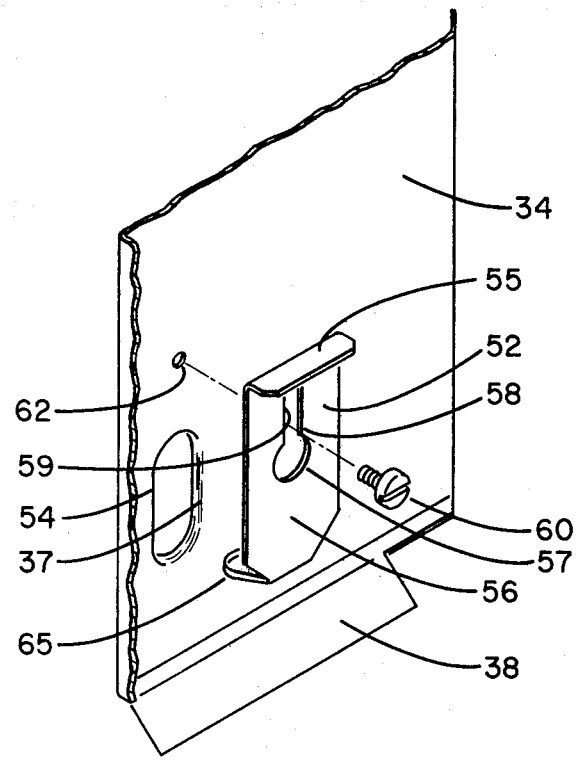
FIG. 2 is an exploded view of a portion of the partition and wire seal observed from the indoor section of the unit.

A portion of partition 34 is shown in FIG. 2. As may be seen in FIG. 2, the partition has a bottom flange portion 38 for engaging the base pan of the unit for locating the partition. The partition additionally defines wire slot 54 having rounded edges 37 rounded from the indoor section toward the outdoor section. Wire seal 52 has a body portion 56 wherein screw slot 58 including sliding portion 59 and head portion 58 is defined. Top flange 55 is connected to one end of body portion 56 and extends outwardly from the plane of partition 34. Flare portion 65 extends from the bottom of the body portion of the wire seal 52 in a direction opposite from the direction of top flange 55. Screw 60 is sized to fit within sliding portion 59 of screw slot 58 and to engage screw hole 62 of the partition to thereby secure the wire seal to the partition.

Figure 3:
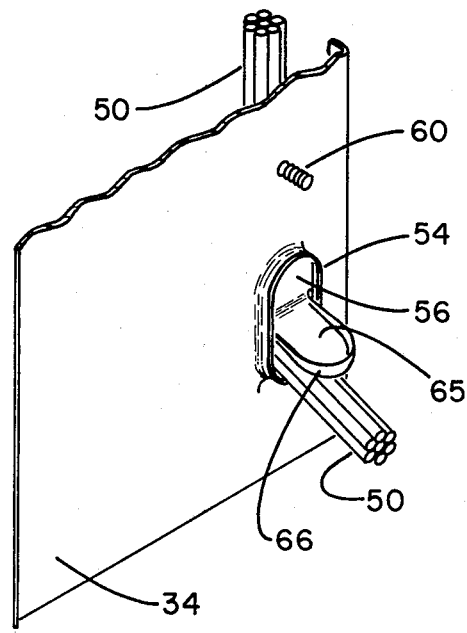
FIG. 3 is a view of a portion of the partition and wire seal of the unit having the wires extending through the wire slot as seen from the outdoor section of the unit.

As can be seen in FIG. 3, wires 50 extend through the wire slot defined by partition 34. Flare portion 65 is angled slightly downwardly from body portion 56 and thereby forces wires 50 to be angled downwardly. The width of flare portion 65 is slightly smaller than the width of the wire slot opening such that the flare portion serves to prevent sideways displacement of the wire seal. Additionally, flare portion 65 has attached thereto flare lip 66 which is rounded upwardly therefrom. The rounding of flare lip 66 and the rounding of rounded edge 37 of partition 34 act to reduce sharp edges which may damage the wires extending through the wire slot. Screw 60 is shown extending through partition 34 for securing the wire seal thereto. Body portion 56 is shown blocking that portion of the wire slot not occupied by wires 50 extending therethrough such that substantially all the wire slot is blocked impeding air flow therethrough.

Upon assembly of the unit, the wires are placed within wire slot 54. The wire seal is then mounted to the unit with the flare portion extending through the wire slot. Screw 60 would then be inserted through the sliding portion or head portion of screw slot 58 to engage screw hole 62. Through sliding engagement between body portion 56 relative to screw 60 and flare portion 65 relative to wire slot 54 the wire seal may move upwardly or downwardly. No other motion of the wire seal is allowed by the engagement of the screw slot with the screw and the flare portion with the wire slot. Top flange 55 is positioned to allow the operator to grasp the outwardly extending flange to slide the wire seal in either direction. During assembly the wire seal slides downwardly such that the wires are secured at the bottom of the wire slot. As a result of the downward angle of the flare portion the wires are forced downwardly. The screw is tightened when the wires are secured in position to maintain the wire seal in that position.

The downward angle of the flare portion forces the wires extending through the wire slot to be angled downwardly as they travel from the indoor section to the outdoor section. Hence, any moisture collecting on the wires in the outdoor section will flow away from the wire slot rather than flowing down the wires into the indoor section where such moisture is unwanted. Likewise, by the utilization of a wire slot and sliding wire seal, the number and size of the wires extending therethrough may be varied and the same components used to secure differing wire arrangements in a relatively air tight arrangement. Hence, this single wire seal may be used on various sized units where wire sizes and the number of wires varies. This standardization of parts results in a reduced inventory and allows the assembler of the units to utilize the same assembly steps in each instance.

The wire seal has been shown having a screw slot 58 including sliding portion 59 and head portion 57. By utilizing head portion 57, screw 60 may be secured in screw hole 62 and then the wire seal placed in position adjacent to the partition by having the head portion 57 pass over the head of screw 60. The entire wire seal may then slide downwardly with the threaded portion of screw 60 being within sliding portion 59. As an alternative thereto, a wire seal may include only sliding portion 59 and in that instance the screw would be inserted through the sliding portion to assemble the wire seal to the partition.

The invention herein has been described with reference to a particular embodiment, however, it is to be understood that variations and modifications can be effected within the spirit and scope of the invention. This device has been described with particular reference to a room air conditioning unit. It is to be understood that this invention has like applicability to units other than room units and to machines designed to perform functions other than just cooling such as heat pump, refrigeration equipment or air handling apparatus.

What is claimed is:

1. An air conditioning unit which comprises a compressor, evaporator and condenser forming a refrigeration circuit, a partition for dividing the unit into an outdoor section including the compressor, condenser and a condenser fan for circulating air in heat exchange relation with the condenser and an indoor section including the evaporator, an electrical controls area and an evaporator fan for circulating air in heat exchange relation with the evaporator, said partition defining a wire slot, wires extending through the wire slot and a wire seal slidably engaged to the partition, said wire seal including a body portion for blocking air flow through the wire slot and a flare portion extending through the slot for engaging the wires in the slot and the body portion defining a screw receiving slot and including a fastener extending through the slot to the partition to allow the wire seal to be slidably engaged to the partition.

2. The apparatus as set forth in claim 1 wherein the wires extend from the electrical controls area of the indoor section to the outdoor section through the partition slot, and wherein the edges of the partition slot are rounded by bending the edges from the plane of the partition.

3. The apparatus as set forth in claim 1 wherein the flare portion extending through the wire slot is angled downwardly and has an exterior width which is slightly less than the interior width of the slot thereby preventing potential movement of the wire seal and wherein the flare portion includes a flare lip rounded upwardly away from that portion of the wire seal that engages the wires.

4. The apparatus as set forth in claim 2 and wherein the wire seal further comprises a top flange portion extending from the body portion in a direction opposite to the flare portion.

5. An adjustable wire sealing arrangement for securing wires extending through a partition of an air conditioning unit in a manner which prevents air flow through the partition which comprises said partition defining a wire slot through which the wires extend and a wire seal including a body portion mounted to the partition for slidable movement relative thereto and including a flare portion extending through the wire slot for securing the wires between the flare portion and an edge of the wire slot defined by the partition and wherein the flare portion extending through the wire slot is sized to allow sliding motion therebetween, and further including a fastener extending through the screw receiving slot to the partition whereby the wire seal may be displaced relative to the partition with the fastener sliding within the screw receiving slot and the flare portion sliding within the wire slot of the partition.

6. The apparatus as set forth in claim 5 wherein the wire slot includes rounded edges formed by bending the partition at the wire slot, and wherein the flare portion of the wire seal includes a flare lip defining a rounded edge to the flare portion whereby the potential for damage to the lines extending through the wire slot is reduced.

7. The apparatus as set forth in claim 5 wherein the flare portion is angled downwardly forcing the wire extending through the wire slot to be angled downwardly.

8. The apparatus as set forth in claim 6 wherein the wire seal further comprises a top flange extending therefrom, said top flange serving as a handle for displacing the wire seal.

* * * * *